(12) United States Patent
Yatabe et al.

(10) Patent No.: US 7,255,390 B2
(45) Date of Patent: Aug. 14, 2007

(54) SEPERATED-PANEL STRUCTURE OF VEHICLEBODY PANEL

(75) Inventors: Takayuki Yatabe, Kawasaki (JP); Keishi Goto, Okazaki (JP); Masashi Umeda, Okazaki (JP); Akitoshi Shii, Okazaki (JP)

(73) Assignees: Mitsubishi Jidosha Engineering Kabushiki Kaisha, Aichi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 110 days.

(21) Appl. No.: 11/250,540

(22) Filed: Oct. 17, 2005

(65) Prior Publication Data
US 2006/0080922 A1    Apr. 20, 2006

(30) Foreign Application Priority Data
Oct. 18, 2004    (JP) .............................. 2004-302784

(51) Int. Cl.
*B62D 25/08* (2006.01)
(52) U.S. Cl. .................... 296/203.04; 296/191; 296/29
(58) Field of Classification Search .................. 296/29, 296/203.04, 191
See application file for complete search history.

(56) References Cited
U.S. PATENT DOCUMENTS
6,846,037 B2 *    1/2005    Engels et al. .......... 296/193.04

FOREIGN PATENT DOCUMENTS
EP    1213208    * 12/2001
JP    2708267 B2    10/1997

* cited by examiner

*Primary Examiner*—Dennis H. Pedder
(74) *Attorney, Agent, or Firm*—Birch, Stewart, Kolasch & Birch, LLP

(57) ABSTRACT

A separated-panel structure of a vehicle body panel including: a first panel, forming a part of an outer shape of a vehicle, including an outer face, a first flange face formed at the rear end of the outer face, and a second flange face formed an end of said outer face to face the trunk opening; a second panel, arranged at the rear of said first panel, including a first bottom face, a first wall face connected to said first bottom face and overlapping said first flange face, and a third flange face formed contiguously to said first wall face and overlapping said outer face, and a fourth flange face formed facing the trunk opening; and a third panel, arranged between a trunk opening and said first panel and between the trunk opening and said second panel, including a second wall forms as a part of an edge of the trunk opening, a third wall face overlapping said second flange face and said fourth flange face, a second bottom face connecting said second wall face and said third wall face, a fifth flange face formed by bending of said third wall face and overlapping said first wall face, and an extending section from said second bottom face toward said first bottom face and overlapping said first bottom face.

3 Claims, 5 Drawing Sheets

A–A

B–B

SEPERATED-PANEL STRUCTURE OF VEHICLEBODY PANEL

BACKGROUND OF THE INVENTION

1. Field of the Invention

The present invention relates to a separated-panel structure preferably applied to a vehicle body.

2. Description of the Related Art

Generally, a lamp-housing recess is formed on the rear part of a vehicle body and accommodates a rear combination lamp.

An outer panel that forms the outer shape of a vehicle body is normally made of a sheet metal panel. When a lamp housing is formed by pressing such a sheet metal panel, the sheet metal panel needs to be separated into a number of sheets because of the design aspect of the lamp and the processing requirement of the lamp housing.

In this case, junctions of separated panels are joined by spot welding and are sealed, so that a lamp housing is formed.

Within the art, a conventional separated-panel structure made of sheet metal is disclosed in, for example, Japanese Patent No. 2708267.

The above-mentioned separated-panel structure requires to be made watertight by using sealant coating. There is however a possibility that insufficient application of a sealant to the joints does not ensure adequate sealing.

With the foregoing problems in view, the object of the present invention is to provide a separated-panel structure of a vehicle with the intention of improving forming characteristics and additionally sealing properties.

SUMMARY OF THE INVENTION

To attain the above object, as a generic feature of the present invention, there is provided a separated-panel structure of a vehicle body panel comprising: a first panel which forms a part of an outer shape of a vehicle; a second panel which is arranged at a rear of the first panel and which has a recess for a rear light; and a third panel which is arranged between a trunk opening and the first panel and between the trunk opening and the second panel, the first panel having an outer face which forms a part of the outer shape of the vehicle, a first flange face which is formed by bending a rear end of the outer face, and a second flange face which is formed by bending an end of the outer face which end faces the trunk opening, the second panel having a first bottom face which forms a bottom of the recess, a first wall face which is connected to the first bottom face and which overlaps the first flange face, and a third flange face which is formed contiguously to the first wall face and which overlaps the outer face, and a fourth flange face formed by bending an end of the third flange face which end faces the trunk opening, and the third panel having a second wall which forms as a part of an edge of the trunk opening, a third wall face which is substantially parallel to the second wall face and which overlaps the second flange face and the fourth flange face, a second bottom face which connects the second wall face and the third wall face, a fifth flange face which is formed by bending a rear end of the third wall face and which overlaps the first wall face, and an extending section which extends from the second bottom face toward the first bottom face and which overlaps the first bottom face.

As mentioned above, the simple configuration of the separated-panel structure of the present invention makes it possible to improve both forming characteristics of each panel and sealing properties. In other words, overlapping joint portions greatly enhance sealing properties as compared with a complex in which touching edges are welded together. Further, each panel can be formed with ease.

Other objects and further features of the present invention will be apparent from the following detailed description when read in conjunction with the accompanying drawings.

DESCRIPTION OF THE PREFERRED EMBODIMENTS

A preferred embodiment of the present invention will now be described with reference to the accompanying drawings.

Figure 4:
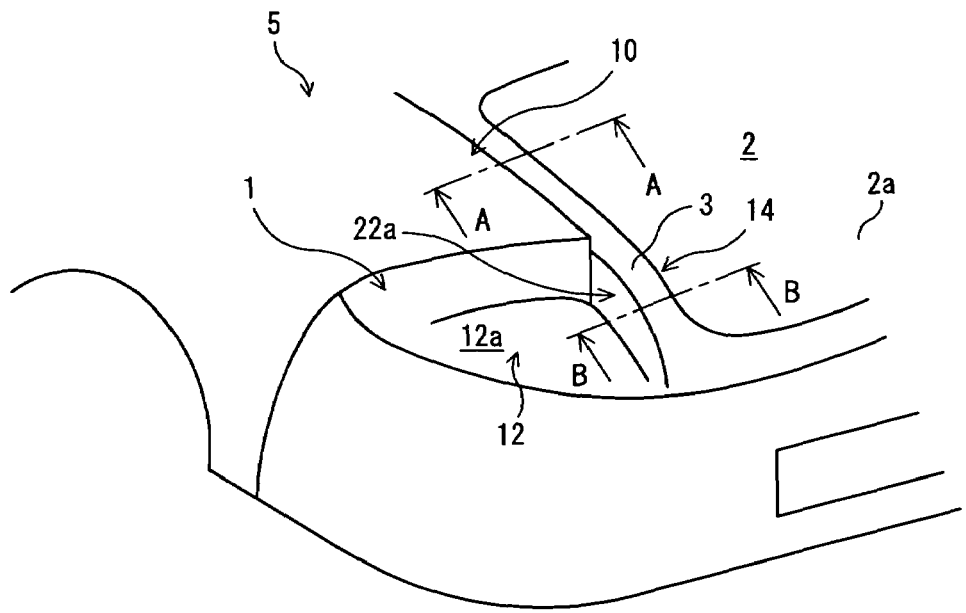
FIG. 4 is a perspective view schematically illustrating a part of a vehicle body to which the separated-panel structure of the present invention is applied.

As shown in FIG. 4, a lamp housing 1 is formed on the rear part (in this example, the left rear part) of a vehicle body 5 to accommodate a non-illustrated rear combination lamp (a lamp assembly).

Further, a trunk 2 is formed between the left and right lamp housings 1, and movement of a non-illustrated trunk lid opens and closes the trunk 2. Specifically, between each lamp housing 1 and the trunk 2, there is formed a groove 3 for draining fluid such as rainwater out of the vehicle. Rainwater flows through the grooves 3 out of the vehicle, so that rainwater does not enter the trunk 2.

Here, a structure of the lamp housing 1 will now be described. The lamp housing 1 is formed by an outer panel (a first panel) 10 which forms a part of an outer shape of the vehicle body, a rear lamp housing panel (a second panel) 12 which is arranged at the rear of the outer panel 10 and which has a recess 12a for accommodating a non-illustrated rear lamp, and a quarter corner panel (a third panel) 14 which is arranged between the rear lamp housing panel 12 and an opening 2a of the trunk 2.

Next, separated and joined structures of panels 10, 12, 14 will now be described with reference to FIGS. 1-3. The outer panel 10 is made of sheet metal and comprises an outer face 16 which forms a part of the outer of the vehicle, a flange face (a first flange face) 18 which is formed by bending one end of the outer face 16 so as to overlap the rear lamp housing panel 12, and a flange face (a second flange) 20 which is formed by bending another end of the outer face 16 so as to overlap the quarter corner panel 14.

The first flange face 18 and the second flange face 20 are contiguously formed and are shaped at the same time by pressing the outer panel 10.

The rear lamp housing panel 12 is made of a metal sheet which has been pressed, and comprises a bottom face (a first bottom face) 22 of the recess 12a of the lamp housing 1, a wall face (a first wall face) 24 which is connected to the bottom face 22, a flange face (a third flange face) 26 which is formed contiguously to the wall face 24 and which opposes the outer face 16, a flange face (a fourth flange face) 28 which is formed contiguously to the third flange face 26 and which opposes a third wall face 32 of the quarter corner panel 14 that is to be described below.

An upper portion of the first wall face 24 and the entire portion of the third flange face 26 overlap the first flange face 18 and the outer face 16 of the outer panel 10, respectively, so that the rear lamp housing panel 12 is joined to the outer panel 10. The fourth flange face 28 overlaps the third wall face 32 of the quarter corner panel 14, so that the rear lamp housing panel 12 is joined to the quarter corner panel 14.

Similarly to the rear lamp housing panel 12, the quarter corner panel 14 is formed by pressing a metal sheet and mainly forms the groove 3 shown in FIG. 4.

Figure 5:
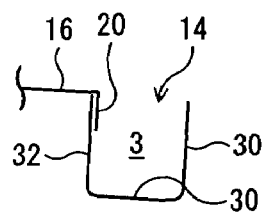
FIG. 5 is a cross-sectional view, taken on line A-A of FIG. 4, schematically illustrating the separated-panel structure of FIG. 1.

Here, the quarter corner panel 14 comprises a wall face (a second wall face) 30 which forms an edge of the trunk opening 2a, a wall face (a third wall face) 32 which is formed to be substantially parallel to the second wall face 30, and a bottom face (a second bottom face) 34 which connects the second wall face 30 and the third wall face 32. As shown in FIG. 5, the second and the third wall faces 30, 32 and the second bottom face 34 unitedly form the groove 3.

Figure 1:
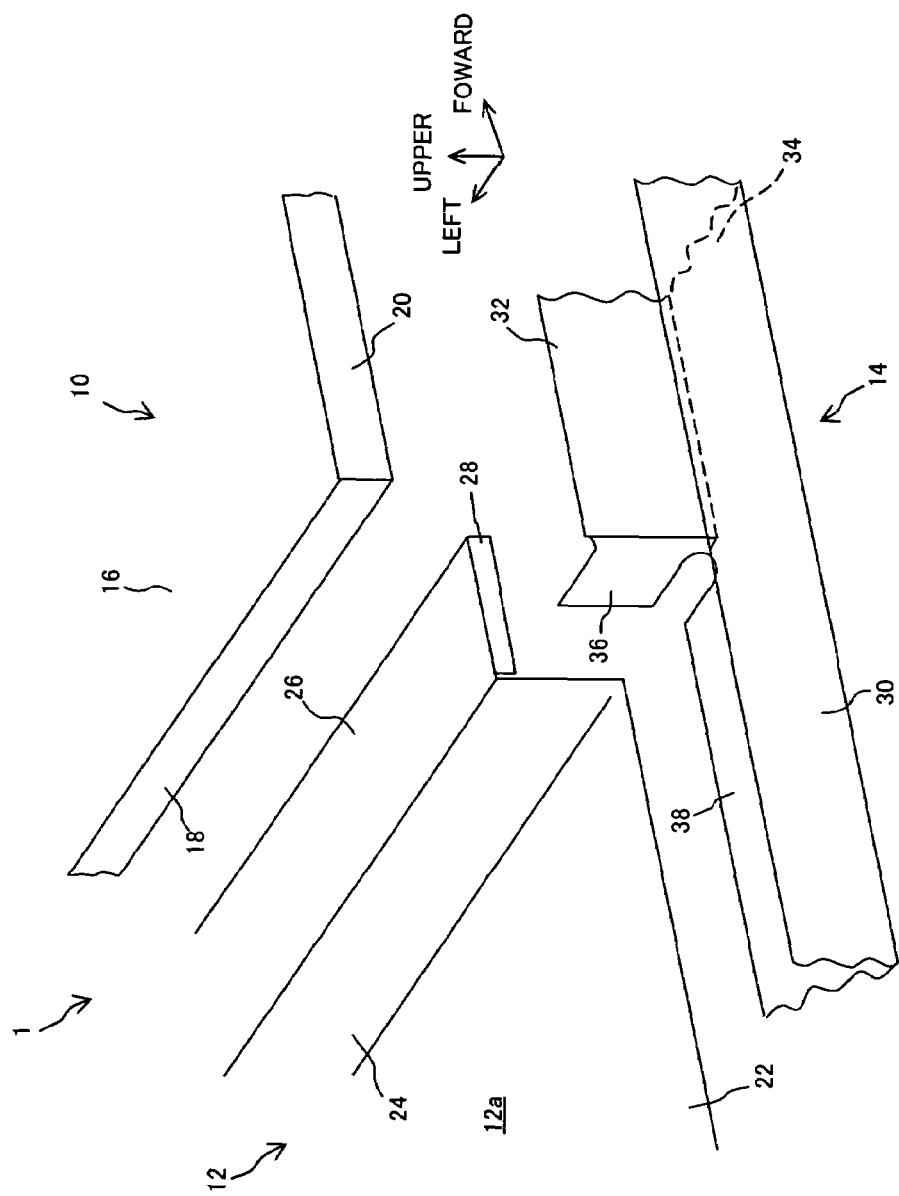
FIG. 1 is an exploded perspective view schematically illustrating the main part of a separated-panel structure of a vehicle body panel according to one embodiment of the present invention.
Figure 2:
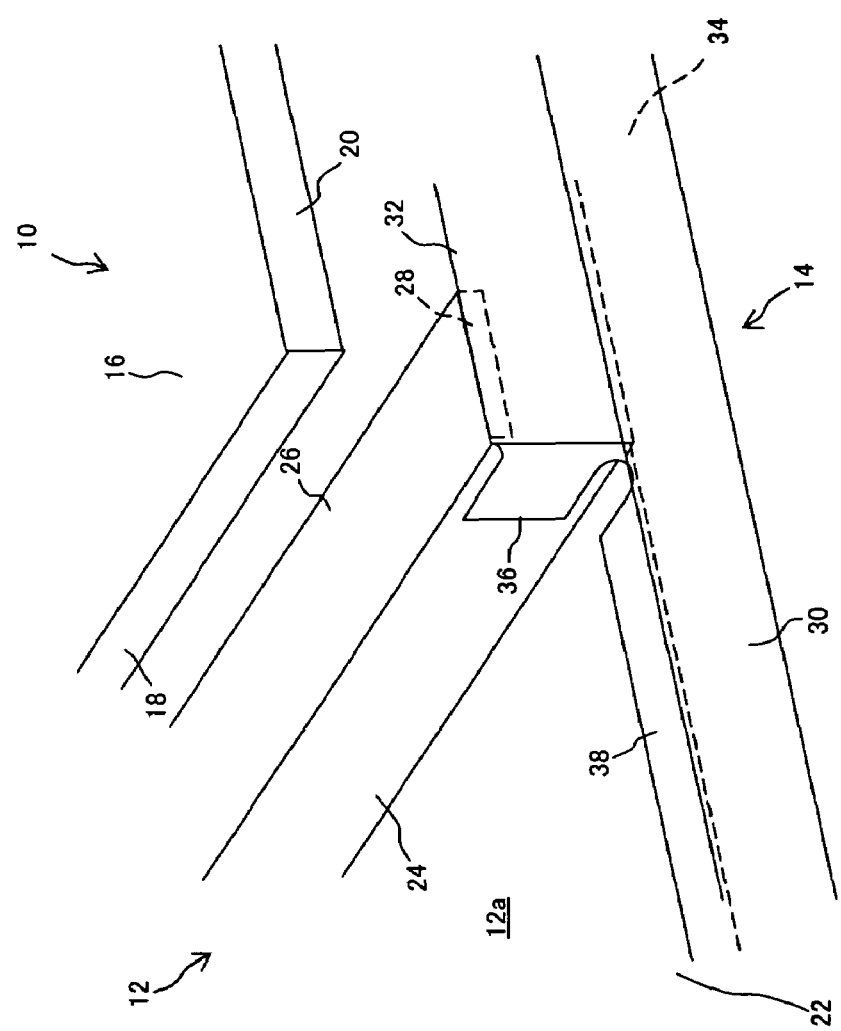
FIG. 2 is an exploded perspective view schematically illustrating the main part of the separated-panel structure of FIG. 1.

As shown in FIG. 1, the third wall face 32 is formed to a point corresponding to the first wall face 24 of the rear lamp housing panel 12 and a flange face (a fifth flange face) 36 is formed at the rear end of the third wall face 32 so as to overlap the first wall face 24.

Figure 6:
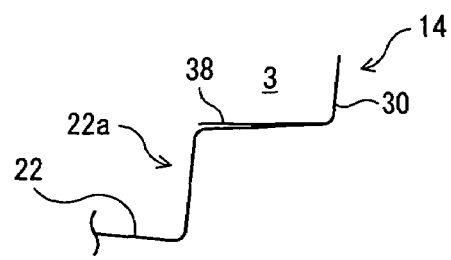
FIG. 6 is a cross-sectional view, taken on line B-B of FIG. 4, schematically illustrating the separated-panel structure of FIG. 1.

At the rear of the point corresponding to the first wall face 24, the quarter corner panel 14 has an extending section 38 which extends from the second bottom face 34 toward the first bottom face 22 and which is joined to the first bottom face 22. In FIGS. 4 and 6, a step 22a is formed between the first bottom face 22 and the extending section 38, but no step appears in FIGS. 1-3 for simplification of the structure.

Figure 7:
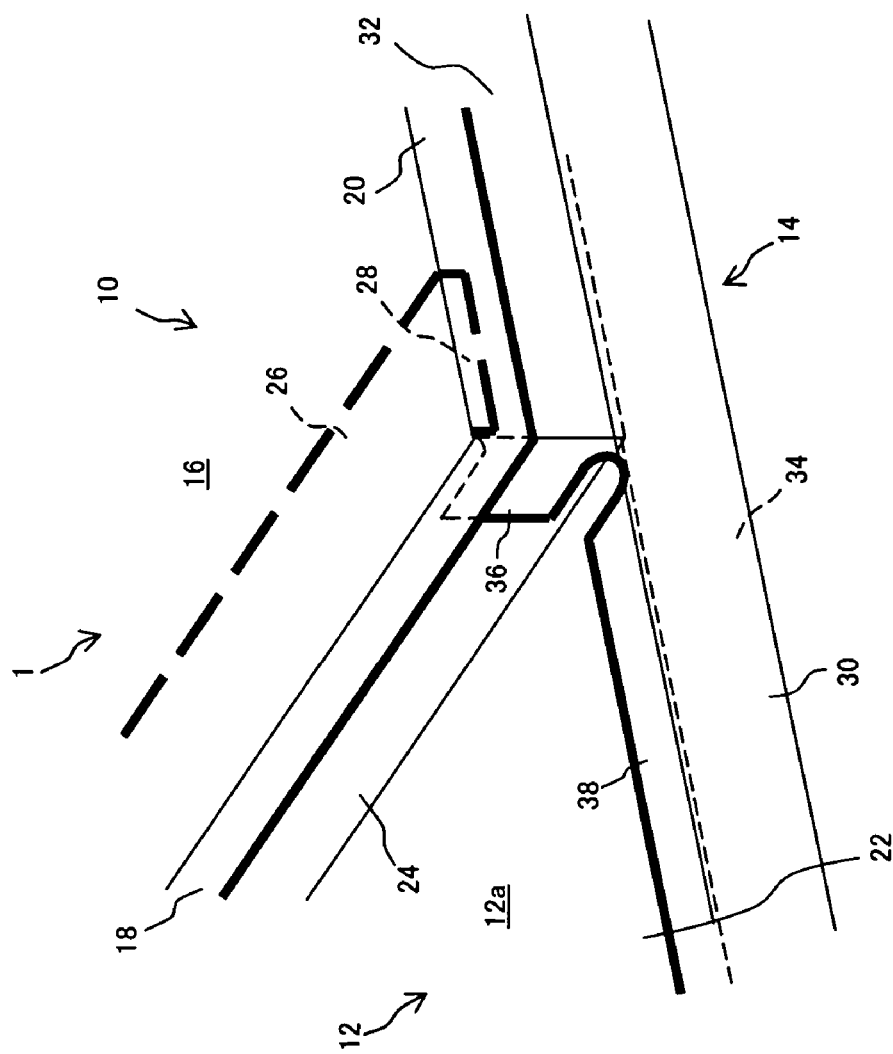
FIG. 7 is a diagram showing application of a sealant to the separated-panel structure of FIG. 1.

As shown in FIG. 7, the recess 12a of the lamp housing 1 accommodates the non-illustrated rear combination lamp, so that a part of the rear combination lamp serves as a wall and the groove 3 is formed at the rear of the outer panel 10.

The separated-panel structure of a vehicle is formed as described above, and the lamp housing 1 is fabricated in a manner below.

First of all, the rear lamp housing panel 12 is joined to the quarter corner panel 14. For this purpose, the extending section 38 of the second bottom face 34 of the quarter corner panel 14 is arranged to overlap the first bottom face 22 of the rear lamp housing panel 12, and the fifth flange face 36 of the quarter corner panel 14 is arranged to overlap the first wall face 24 of the rear lamp housing panel 12. At the same time, the fourth flange face 28 of the rear lamp housing 12 is arranged to overlap the third wall face 32 of the quarter corner panel 14.

Figure 3:
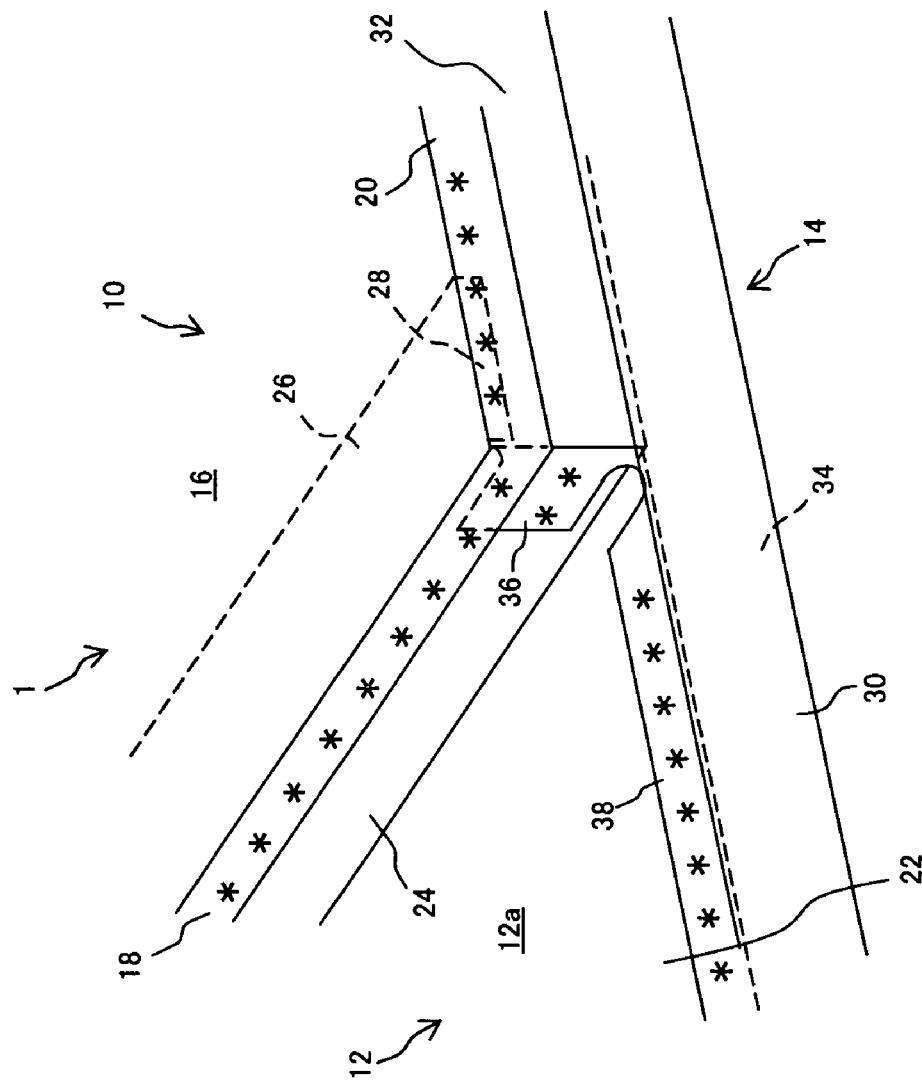
FIG. 3 is an exploded perspective view schematically illustrating the main part of the separated-panel structure of FIG. 1.

Keeping the above overlapping state, the outer panel 10 is put on the rear lamp housing panel 12 and the quarter corner panel 14, as shown in FIG. 3, such that the first flange face 18 and the second flange face 20 of the outer panel 10 overlap the upper portion of the first wall 24 of the rear lamp housing panel 12 and the upper portion of the third wall face 32 of the quarter corner panel 14, respectively.

Then spot welding is applied to overlapping portions (where * marks are put in FIG. 3) in order to join the panels 10, 12 and 14, whereby the lamp housing 1 is formed.

Alternatively, the rear lamp housing panel 12 and the quarter corner panel 14 may be previously joined together by spot welding and then the outer panel 10 may be welded to the panels 12 and 14.

Next, sealing operation is carried out on the lamp housing 1. Since the lamp housing 1 is formed by joining a number of separated panels 10, 12 and 14, a sealant is applied to joints of the panels with the intention that rainwater does not invade the inside of the lamp housing 1 from the joints.

Specifically, to a joint between the first flange face 18 and the first wall face 24 and a joint between the second flange face 20 and the third wall face 32, a sealant is applied from the outside. In the same manner, a sealant is applied from the outside to a joint between extending section 38 of the second bottom face 34 and the first bottom section 22 and a joint between the first wall face 24 and the fifth flange face 36 (see thick solid lines on FIG. 7). Conversely, a sealant is applied from the inside to a joint between the outer face 16 and the third flange face 26 and a joint between the fourth flange 28 and the third wall face 32 (see broken lines on FIG. 7).

As described above, since a separated-panel structure of a vehicle body according to an embodiment of the present invention is formed by joining three panels 10, 12 and 14 which have faces that partially overlap each other, a resultant joint structure has a greatly improved sealing capability as compared with a complex formed by butt welding in which touching edges are welded together. As an advantageous result, the reliability of the seal of the present invention can be improved.

Additionally, the lamp housing 1 is formed by three panels 10, 12 and 14 and consequently is simple in structure.

As described above, each of the panels 10, 12 and 14 can be shaped by an easy process whereby the lamp housing 1 that is complex in shape can be fabricated in a simple process without boosting fabrication costs.

Since the first flange face 18 and the second flange face 20 are contiguously formed at the same time by pressing the outer panel 10, it is possible to enhance the design (the appearance) of the vehicle body and prevent increasing cost.

Further, the present invention should by no means be limited to this foregoing embodiment, and various changes or modifications may be suggested without departing from the gist of the invention. For example, the size of an overlapping portion of a flange or the height of a wall face should by no means be limited and may be determined in terms of the design and/or join strength required for the vehicle body.

What is claimed is:

1. A separated-panel structure of a vehicle body panel comprising:
   a first panel which forms a part of an outer shape of a vehicle;
   a second panel which is arranged at a rear of said first panel and which has a recess for a rear light; and
   a third panel which is arranged between a trunk opening and said first panel and between the trunk opening and said second panel,
      said first panel having an outer face which forms a part of the outer shape of the vehicle, a first flange face which is formed by bending a rear end of said outer face, and a second flange face which is formed by bending an end of said outer face which end faces the trunk opening, said second panel having a first bottom face which forms a bottom of the recess, a first wall face which is connected to said first bottom face and which overlaps said first flange face, and a third flange face which is formed contiguously to said first wall face and which overlaps said outer face, and a fourth flange face formed by bending an end of said third flange face which end faces the trunk opening, and said third panel having a second wall face which forms as a part of an edge of the trunk opening, a third wall face which is substantially parallel to said second wall face and which overlaps said second flange face and said fourth flange face, a second bottom face which connects said second wall face and said third wall face, a fifth flange face which is formed by bending a rear end of said third wall face and which overlaps said first wall face, and an extending section which extends from said second bottom face toward said first bottom face and which overlaps said first bottom face.

2. A separated-panel structure of a vehicle body panel according to claim 1, wherein said first flange face and said second flange face are contiguously formed at the same time by pressing said first panel.

3. A separated-panel structure of a vehicle panel according to claim 1, wherein said second wall face, said third wall face and said second bottom face form a groove for draining rainwater out of the vehicle.

* * * * *